Feb. 11, 1941.  W. W. ACHÉ  2,231,313
COMBINED BUMPER, HEADLIGHT, AND LICENSE PLATE HOLDER
Filed Dec. 13, 1939  3 Sheets-Sheet 1
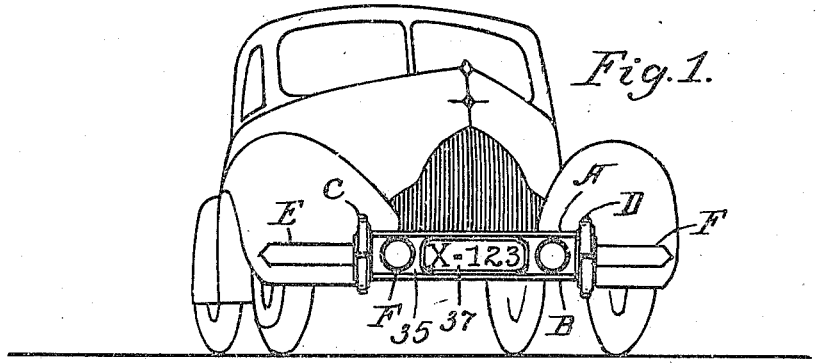
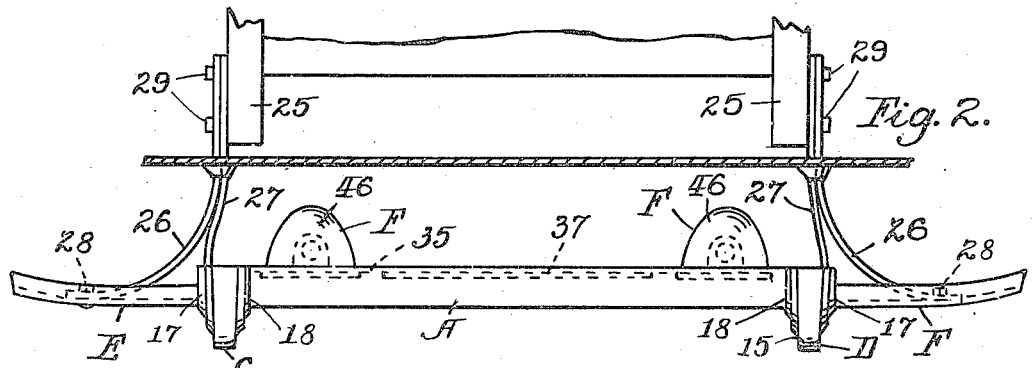
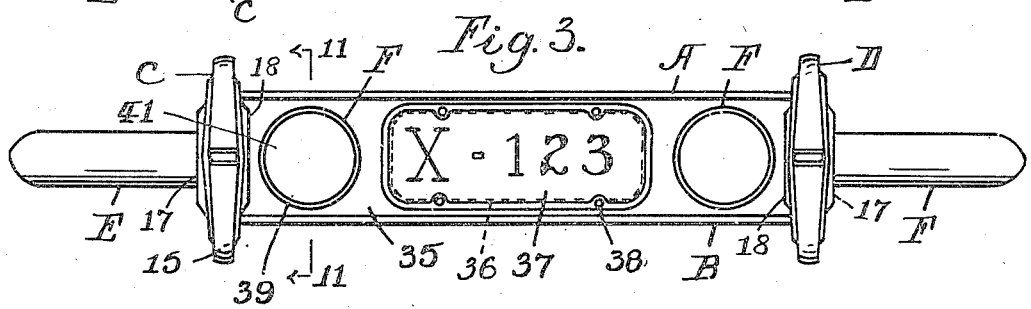
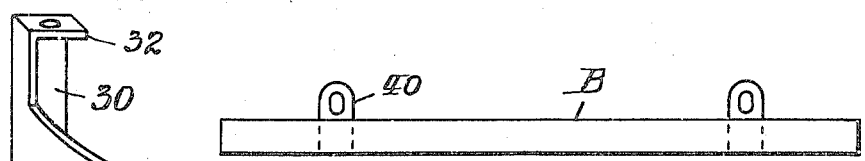
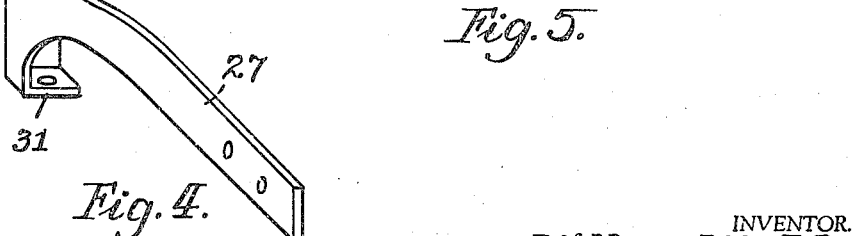
INVENTOR.
William W. Ache
BY
ATTORNEY.

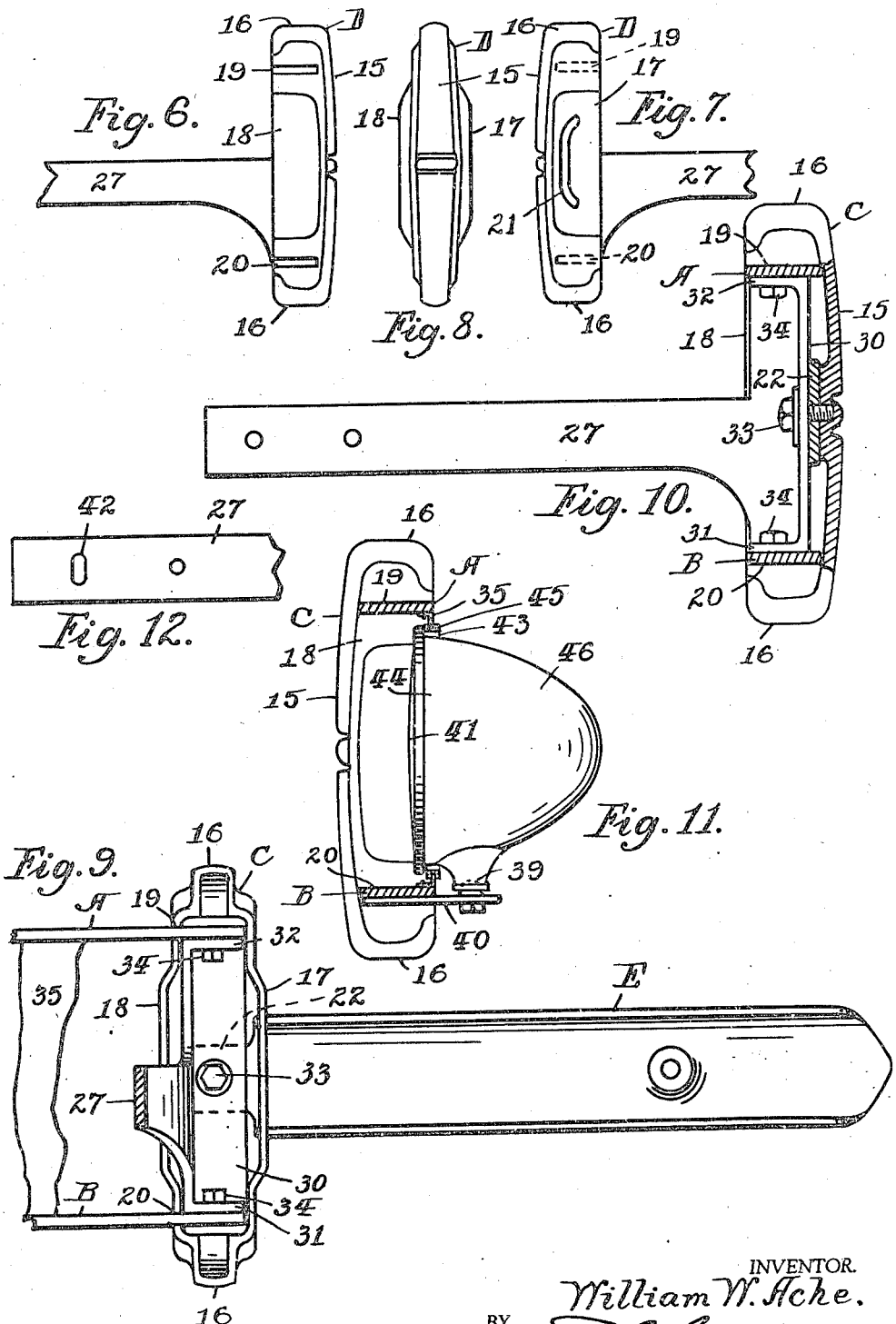

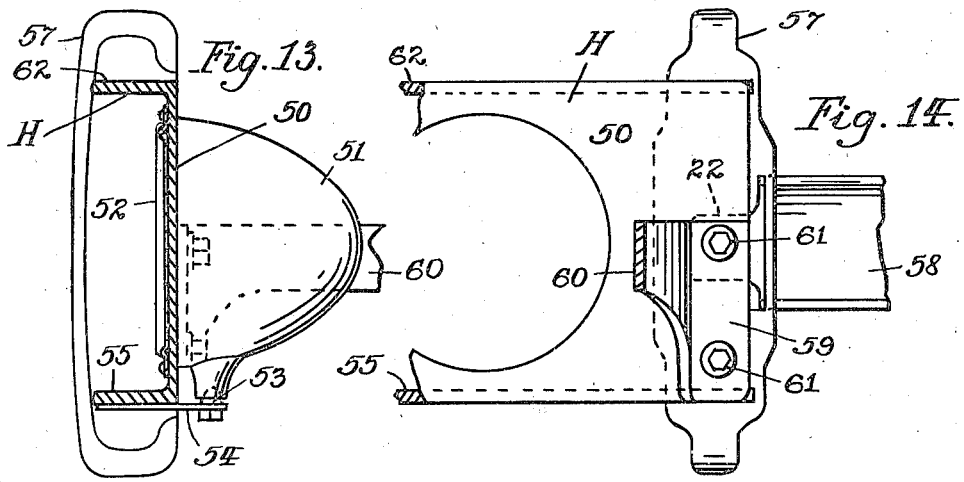
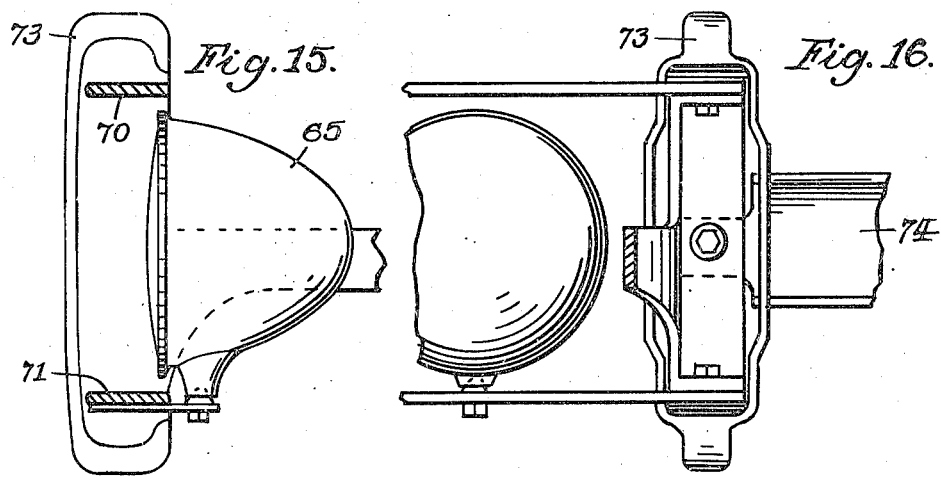
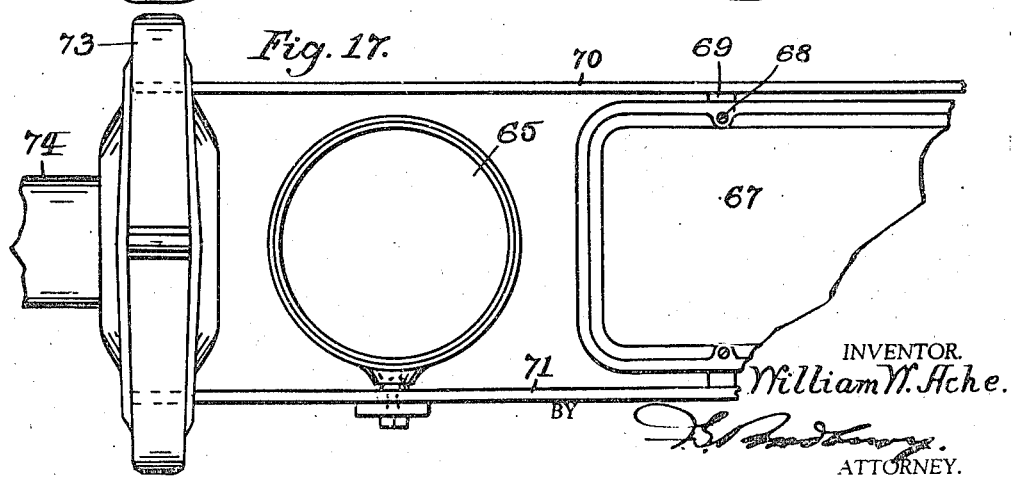

Patented Feb. 11, 1941

2,231,313

UNITED STATES PATENT OFFICE 2,231,313

COMBINED BUMPER, HEADLIGHT, AND LICENSE PLATE HOLDER

William W. Aché, Los Angeles, Calif.

Application December 13, 1939, Serial No. 308,990

13 Claims. (Cl. 293—55)

This invention relates to a combined bumper, headlight and license plate holder for vehicles. More particularly this invention relates to improvements upon the construction set forth in my companion application for patent filed January 23, 1939, bearing Serial Number 252,241. In said application a plurality of lights are supported in the back portion of a bumper frame by which they are protected, the lamps being supported independently of the bumper. In the present improvements the marginal bumper frame is of improved construction and is supported in an improved manner whereby it is simplified and made stronger and is more durable and more effective in performing its function.

The primary object of this invention is to most effectively illuminate the roadway ahead of a vehicle below the plane of direct vision of the occupants of approaching vehicles, whereby the blinding effect which has heretofore been so prevalent is reduced or prevented. Another important object is to illuminate the roadway ahead of a vehicle through fog, smoke or rain so as to provide greater safety in driving. Another object is to utilize the bumper in the most effective manner as a guard so as to protect the lighting means and license plate against injury. Another object is to provide improved means for supporting the bumper whereby greater simplicity and strength of construction are produced at less expense than hertofore and accompanied by greater effectiveness in use. Among still further objects is to combine, when desired, what is termed a sealed beam lamp into part of the construction of the bumper and license plate holder in such manner as to improve the lighting effect and most effectively illuminate the roadway ahead of the vehicle without blinding effect, to simplify and reduce expense in construction, and to preserve the brilliancy and degree of illumination over a longer period.

With these and other objects in view my invention comprises the improved features of construction and combinations of parts hereinafter described and claimed.

In the accompanying drawings forming part of this specification, Fig. 1 is a front perspective view of an automobile equipped with my improved combination bumper, head light and license plate holder; Fig. 2 is a plan of my improved bumper, head light and license plate holder showing a fragment of the front end of an automobile upon the chassis frame of which said device is mounted; Fig. 3 is a front elevation of the structure shown in Fig. 2; Fig. 4 is a perspective view of one of the supporting brackets which is incorporated into part of the bumper frame; Fig. 5 is a plan of the lower bumper bar which forms part of the lamp and license plate holder; Fig. 6 is a side elevation of one of the end bumper frame elements and a portion of its support; Fig. 7 is a side elevation similar to Fig. 6, looking at the opposite side of the bumper element; Fig. 8 is a front elevation of the structure shown in Figs. 6 and 7; Fig. 9 is an elevational view on a slightly enlarged scale looking at the back of the end bumper element and showing fragments of the bracket support and of the upper and lower bumper bars, and a portion of the back of the marginal frame including one of the end elements of the bumper; Fig. 10 is an elevation of the bracket member of Fig. 4, taken from the right of Fig. 4, and showing the bracket member and bumper elements assembled, the bumper elements being shown in vertical section; Fig. 11 is a section taken approximately on line 11—11 of Fig. 3; Fig. 12 is a plan of a detail showing a portion of one of the bumper supports slotted to permit angular adjustment in a vertical plane of the bumper to vary the direction in which the light can be aimed; Fig. 13 is a typical vertical cross section through the marginal bumper frame showing a modification in which a longitudinal channel beam is employed for forming the upper and lower bumper bars and a supporting back in the frame; Fig. 14 is an elevational view partly in section looking at the back of a portion of the structure shown in Fig. 13; Fig. 15 is a typical vertical cross section through the marginal bumper frame showing a modification in which the back of the marginal frame is open; Fig. 16 is an elevation partly in section looking at the back of a detail of the structure shown in Fig. 15, and Fig. 17 is a front elevation of a detail of the structure shown in Fig. 15.

My invention is composed of a marginal frame having upper and lower horizontal flat impact members A and B and upwardly extending and impact members C and D. At the opposite ends of this frame are secured laterally extending and bumper members E and F. This structure is adapted to be supported upon the front end of the chassis frame of a vehicle to function effectively as a bumper and protect the vehicle. The end members C and D are similar in construction and resemble in appearance ornamental grill bumper guards. Each of the marginal frame and bumper guards consists of a hollow vertical bumper impact member having an opening through its back, a suitable front impact surface 15, upper and lower projecting ends 16, and vertical side walls 17 and 18. It may be of suitable vertical length to protect the bumper from interlocking with ordinary bumpers on other vehicles and it may be of suitable ornamental design. The upper and lower portions of the inwardly facing sides of the bumper members C and D are provided with horizontal slots 19 and 20, through which the ends of the upper and lower flat impact bars A and B are socketed to assist in joining the parts and firmly holding the members A and B edgewise facing forwardly. In this manner a deep rigid marginal bumper frame is formed in the back end of which the light elements and license plate are supported in protected position against damage when the bumper strikes an object. The outer vertical side wall 17 of each of the vertical bumper members C and D is formed with a curved slot 21. This slot is of such shape and dimensions as to produce a closely fitting socket in which the inner end of the horizontal bumper member E or F is held secured. Any suitable shape and size of horizontal end bumper may be employed and the socket in the vertical bumper member designed accordingly. The bumper structure thus produced provides a strong and rigid marginal impact holding frame having single horizontal end bumper members projecting laterally from each of its ends. The inner end of each of the horizontal bumper members E and F projecting within the socket in the side wall of the vertical bumper member is formed with an inwardly projecting flat boss 22 which is adapted to be held clamped to the vertical bumper member to assist in consolidating the members together into a unitary structure as will be hereinafter described.

The above bumper structure is supported upon each of the forward terminal members 25 (see Fig. 2) of the chassis frame of a vehicle by pairs of bracket supports near each end. Each pair of these bracket supports is composed of arms 26 and 27. The outer bracket arm 26 extends forwardly and outwardly from the end of the chassis frame to near the outer extremity of the companion horizontal end bumper member E or F to which it is secured by a bolt 28 or other suitable means. The bracket arm 27 extends forwardly from and its rearward end together with the rearward end of arm 26 are secured by bolting at 29 or other suitable means to the forward end of the terminal 25 of the chassis. The forward end of the supporting bracket arm 27 is formed with a vertical inturned flange 30 and a pair of upper and lower inturned horizontal flanges 31 and 32. These flanges are united and of suitable shape and dimensions so as to freely enter the back of the companion vertical end bumper member C or D. When thus inserted the vertical flange 30 together with the boss 22 are firmly secured by a bolt 33 or other suitable means to the inner portion of the vertical bumper member. The inner projecting ends of the upper and lower bumper bars A and B are secured by bolts 34 or other suitable means to the pair of inturned horizontal flanges 31 and 32. In this manner and by the flanged end of the supporting bracket 27 the parts of the marginal bumper frame and horizontal end bumper members are consolidated and bonded together by strong, simple and effective means. The end bumper members C and D of the marginal bumper frame extending vertically function as guards to assist the bumper in protecting the lamps and license plate held in the marginal bumper frame in addition to other parts of the vehicle.

The marginal headlight and license plate holding frame thus formed in the median portion of the bumper is closed on its rearward side by a back 35 which is composed of a plate or sheet of thin metal or other suitable material. This plate is suitably fastened by brazing or other suitable means at its edges to the upper and lower bumper bars and the end bumper members of the marginal frame and may be solid or a grill to circulate air. This back is formed with a license plate receiving opening 36 in its median portion in which a license plate 37 may be secured by screws 38 or other suitable fastening means. The license plate may be secured to the forward face of the back without providing an opening therein. A pair of headlights or any suitable number are arranged at the back of the holding frame. As shown a lamp F is placed near each end. This lamp is of sealed beam type but it may be of any other type desired. By "sealed beam type" is meant the vacuum type of electric lamp having its lighting element and the reflector means by which a beam of light is projected seated within a bulb from which air has been exhausted, whereby the reflecting means is protected from dust and tarnishment and a reflected beam of light is produced without an outside reflector or a lamp housing being employed. The lamp body or bulb 46 is supported by a ball and socket joint 39 on a rearwardly extending boss 40 which is welded or otherwise formed in the lower horizontal bumper bar B. Thus the axis of the light beam projected forwardly through the lamp lens 41 may be adjusted vertically or horizontally to suit road conditions. The lamp may embody the well known depressible beam and fixed focus features and may be operated in the usual manner. Tilting of the lamp in a vertical plane to adjust the direction and focus of the light beam may also be varied by employing a vertical slot 42, as illustrated in Fig. 12, on the supporting bracket arms 26 and 27 through which one of the bolts 29 is secured. The back 35 is provided with an opening 43 of sufficient size to admit the rim 44 of the lamp body and permit its adjustment while its lens 41 remains in the inner end of the deep chamber formed by the marginal bumper frame. A soft buffer 45 made out of rubber or other suitable material may be interposed between the edge of opening 43 and the lamp rim 44 to reduce friction and prevent sound.

From the above description it will be observed that I have provided a central headlight unit which obviates the need of two headlights on the body or fenders of the vehicle such as are customarily used. Also that I have provided a combined bumper, headlight and license plate unit which projects the light below the line of vision of the occupants of an approaching vehicle thus avoiding or reducing the glare and blinding effect which is highly objectionable. Also said unit projects the light under a fog thus giving the driver a more distinct view in front and sufficiently at the sides of the road, showing the driver how close he or she is to the edges. By placing the headlights in the bumper frame and close to the ground the discomfort of blinding and glaring lights through the back window of a car proceeding in the same direction is also avoided or reduced. An effective holder is also provided for the license plate which protects the plate from damage and in which the plate is illuminated by the headlights in the bumper marginal frame by indirect reflected light so that it is plainly visible after dark. A complete simplified structure is also produced for the bumper headlights and license plate holder which is simple and strong and inexpensive in construction and protects the lamps and license plate from accidental impact.

Thus the unitary impact bumper structure produced by my invention constitutes an efficient and thoroughly guarded headlight, license plate holder and bumper fixture which serves to effectively safeguard the vehicle and occupants thereof.

While I have illustrated my invention with a marginal rectangular impact protecting bumper frame constructed by upper and lower parallel horizontal bars rigidly supported in spaced relation by vertical end ornamental bumper guards, it will be understood that the shape of this frame may be changed and varied within the spirit of the invention.

When desired the horizontal bumper members and back of the marginal frame may be a solid horizontal channel beam H consolidated with vertical end bumper members to form an exceedingly strong and rigid marginal frame capable of resisting shocks and jars with little or no damage. In this structure as shown in Figs. 13 and 14 the web 50 of the channel member H forms a strong and rigid back in the inner end of the marginal frame, in which the lamps such as 51 and license plate 52 are supported. The lamp is shown secured by the ball and socket joint 53 on the boss 54 which in turn is secured by welding or other suitable means to the lower flange or bar 55 of the channel member. Each vertical end bumper member 57, boss 22 on the inner end of the adjacent horizontal end bumper member 58 and the adjacent end of the web 50 of the channel member are fastened to a single vertical flange 59 on a supporting bracket 60 by bolts 61. Thus the flanges or bars 55 and 62, back 50 and vertical end bumper members 57, produce a deep chamber in the back end of which the lamps and license plate are supported in completely protected position.

In the construction shown in Figs. 15 to 17 inclusive, the back of the marginal frame is shown open to allow free circulation of air through the frame. Horizontal bars 70 and 71 are joined to the vertical end bumper members such as 73 to form a marginal frame as in the forms above described and a horizontal end bumper member 74 on each end of the marginal frame may be employed. The lamp 65 is shown supported in the inner end of the frame by the lower horizontal bar 71 as above described. The license plate 67 is secured by screws 68 and clips 69 or any other suitable means to the rearward edges of the horizontal bars 70 and 71 of the frame. In both alternate constructions shown in Figs. 13 to 17 inclusive, the vertical end bumper members are mounted upon the chassis by bracket members similar to those shown and described above or they may be supported by bracket members of modified form or any other suitable supporting means desired within the spirit of the invention.

In accordance with the patent statutes, I have described the principles of operation of my invention, together with the construction thereof which I now consider to represent the best embodiment thereof, but I desire to have it understood that the apparatus shown is only illustrative and that the invention can be carried out by other means and applied to uses other than those above set forth within the scope of the following claims.

I claim:

1. A vehicle bumper assembly, comprising a pair of substantially horizontal and laterally spaced end bumper members, vertical bumper guard members on the opposed ends of said members, vertically spaced impact members having horizontal ends connecting said bumper guard members together, means mounting said assembly on a vehicle, said means including a pair of bracket members, each having integral portions connecting an end member, a guard member and said vertically spaced members together.

2. The structure of claim 1, said guard members being hollow, spaced slots in the opposed inner side faces of said guard members, and the ends of said vertically spaced members extending inwardly of said members through said slots.

3. The structure of claim 1, said guard members being hollow, spaced slots in the opposed inner side faces of said guard members, the ends of said vertically spaced members extending inwardly of said guard members through said slots, closed slots in the outer sides of said guard members, the inner ends of said end members extending inwardly of said guard members through said slots.

4. The structure of claim 1, said guard members being hollow, spaced slots in the opposed inner side faces of said guard members, the ends of said vertically spaced members extending inwardly of said guard members through said slots, closed slots in the outer sides of said guard members, the inner ends of said end members extending inwardly of said guard members through said closed slots, said integral portions of said brackets each including a laterally directed vertical flange and a pair of vertically spaced horizontal flanges, said vertical and horizontal flanges being positioned within said hollow guard members, means connecting said vertical flange to a guard member and the inner end of an end member, and means connecting said horizontal flanges to the adjacent ends of said vertically spaced members.

5. A vehicle bumper assembly, comprising a pair of substantially horizontal and laterally spaced end bumper members, vertical bumper guards on the opposed inner ends of said end members, and a channel member including a web and forwardly facing flanges extending between said guards, and means connecting said end members, guards and channel member together.

6. The structure of claim 5, said channel member and the opposed inner sides of said guard cooperating to provide an accessory receiving recess open at the front, and means adapted to mount accessories in said recess rearwardly of the front thereof.

7. The structure of claim 5, said guard members being hollow, slots in the opposed inner side faces of said guard members, the ends of said channel member extending into the interior of said guard members with said flanges seated in said slots.

8. The structure of claim 5, said guard members being hollow, slots in the opposed inner side faces of said guard members, the ends of said channel member extending into the interior of said guard members with said flanges seated in said slots, closed slots in the outer side faces of said guard members, and the inner ends of said end members extending into said guard members through said slots.

9. The structure of claim 1, means on both of said vertically spaced members adapted to mount a license plate therebetween, and means on the lower vertically spaced member adapted to mount headlamps thereon between said license plate mounting means and said guard members.

10. The structure of claim 1, said guard members being hollow, said spaced vertical members being flat members arranged edgewise with their flat faces horizontal, vertically spaced slots in the opposed inner faces of said guard members receiving the ends of said vertically spaced members therein.

11. The structure of claim 1, said guard members being hollow, said spaced vertical members being flat members arranged edgewise with their flat faces horizontal, vertically spaced slots in the opposed inner faces of said guard members receiving the ends of said vertically spaced members therein, said end members being substantially flat and disposed with their flat faces vertical, closed vertical slots in the outer side faces of said guard members receiving the inner ends of said end members therein.

12. The structure of claim 1, said guard members being hollow, said spaced vertical members being flat members arranged edgewise with their flat faces horizontal, vertically spaced slots in the opposed inner faces of said guard members receiving the ends of said vertically spaced members therein, said end members being substantially flat and disposed with their flat faces vertical, closed vertical slots in the outer side faces of said guard members receiving the inner ends of said end members therein, said guard members and vertically spaced members cooperating to provide a substantially rectangular accessory receiving recess open at the front, and means closing said recess at the rear thereof and formed to provide accessory receiving openings therein.

13. A vehicle bumper assembly, comprising a pair of substantially horizontal and laterally spaced end bumper members, vertical bumper guards on the opposed ends of said members, said guards being hollow, vertically spaced slots in the opposed inner side faces of said guards, vertically spaced impact members connecting said guards together, the ends of said vertically spaced members extending inside said guards through said slots, means connecting said ends of said vertically spaced members to adjacent guards and end bumper members, and means carried by said vertically spaced members and adapted to mount a license plate in the space therebetween.

WILLIAM W. ACHÉ.